Aug. 8, 1967          H. CANCRINUS          3,334,528

HYDRAULIC FLUID TORQUE TRANSMITTER

Filed March 1, 1965          2 Sheets-Sheet 1

Inventor
Hendrik Cancrinus
By
Wenderoth, Lind & Ponack
Attorneys

Aug. 8, 1967 H. CANCRINUS 3,334,528
HYDRAULIC FLUID TORQUE TRANSMITTER
Filed March 1, 1965 2 Sheets-Sheet 2

Inventor
Hendrik Cancrinus
By
Wenderoth, Lind & Ponack
Attorneys

United States Patent Office 3,334,528
Patented Aug. 8, 1967

3,334,528
HYDRAULIC FLUID TORQUE TRANSMITTER
Hendrik Cancrinus, Rondebosch, Cape Province, Republic of South Africa, assignor to Inpower Works (Proprietary) Limited, Cape Town, Cape Province, Republic of South Africa
Filed Mar. 1, 1965, Ser. No. 436,079
Claims priority, application Republic of South Africa, Mar. 2, 1964, 64/0987
23 Claims. (Cl. 74—752)

ABSTRACT OF THE DISCLOSURE

A fluid torque transmitter, which comprises a rotatable carrier; a drum having at least two fluid compartments; torque generating elements in at least one compartment, and being drivingly connected to a planet wheel rotatable in the carrier; an output sun wheel drivingly connected to the planet wheel or planet wheels; and pump means drivingly connected to the planet wheel for displacing liquid out of one compartment (suction compartment) into another compartment (delivery compartment).

---

This invention relates to a torque transmitter using hydraulic fluid.

According to the invention, a torque transmitter comprises a carrier having means for mounting it rotatably about its axis, and having means for connecting it to a source of rotary power; a drum around the carrier and co-axial with it, there being provided at least two compartments within the drum adapted to contain hydraulic fluid; at least one planet wheel mounted on the carrier to rotate about its own axis spaced away from the carrier axis; torque-generating elements in at least one of the compartments and connected to the planet wheel; a sun wheel co-axial with the carrier axis and having means for connecting it to a load to absorb rotary power; drive means drivingly connecting the planet wheel with the sun wheel and adapted to transmit torque applied about the axis of the planet wheel to the sun wheel; and pump means drivingly connected to the planet wheel and adapted when the planet wheel rotates relatively to the carrier to displace liquid out of one compartment, referred to as the suction compartment, into another compartment, referred to as the delivery compartment.

The torque transmitter may include return means for returning liquid from the delivery compartment to the suction compartment. There may be provided a wall separating the two components, the return means including at least one bleed hole provided in the said wall.

In an alternative arrangement of return means, the carrier may have at least two axially spaced compartments, one in communication with the suction compartment, and the other in communication with the delivery compartment, the two axially spaced compartments being separated by a circumferential wall extending inwardly from the carrier inner periphery and defining a central opening. The return means may include a scoop extending across the said wall through the said opening and mounted in the drum and having an inlet adapted to receive liquid from the inner periphery of the one axially spaced compartment and having an outlet over the other axially spaced compartment, and means for displacing the inlet of the scoop into and out of a layer of liquid along the inner periphery of the said axially spaced compartment; whereby liquid may be transferred from the one axially spaced compartment to the other when the drum rotates.

The pump means may be disposed in the suction compartment, and the torque-generating elements may be disposed in the delivery compartment.

The carrier and the drum may be integral. The drum may have a plurality of sub-suction compartments circumferentially spaced about the drum axis, the sub-suction compartments being interconnected to constitute the suction compartment, the pump means being arranged to serve one of the sub-suction compartments. For each remaining sub-suction compartment there may be provided pump means together with an associated planet wheel, torque-generating elements and drive means for drivingly connecting said planet wheel to the sun wheel; the several pump means and their associated planet wheels with their drive means and torque-generating elements being mounted in dynamic balance about the drum axis, the drive means of the several planet wheels engaging with the sun wheel.

The drum may have an additional compartment adapted to contain hydraulic fluid, and there may be provided a further planet wheel mounted on the carrier to rotate about its own axis spaced away from the carrier axis; further torque-generating elements connected to the further planet wheel; a further sun wheel co-axial with the carrier axis, and having means for connecting it to a load to absorb rotary power; further drive means drivingly connecting the further planet wheel with the further sun wheel and adapted to transmit torque applied about the axis of the planet wheel to the sun wheel; further pump means connected to the planet wheel and adapted when the planet wheel rotates relative to the carrier to displace liquid out of the additional compartment into the suction compartment; and return mean for returning liquid from the suction compartment into the additional compartment.

The torque transmitter may include at least one additional planet wheel mounted on the carrier to rotate about its own axis and spaced away from the carrier axis; additional torque-generating elements in the additional compartment and connected to the additional planet wheel; an additional sun wheel co-axial with the carrier axis and having means for connecting it to a load to absorb rotary power; and additional drive means drivingly connecting the additional planet wheel with the additional sun wheel and adapted to transmit torque applied about the axis of the planet wheel to the sun wheel.

The drum may have a plurality of sub-suction compartments comprising a set and a plurality of sub-delivery compartments comprising a second set, the sets of compartments being circumferentially spaced about the drum axis, and the sub-suction compartments being interconnected to constitute the suction compartment, and the sub-delivery compartments being interconnected to constitute the delivery compartment. The first mentioned sun wheel then corresponds to one set of sub-compartments, and there may then be provided a second sun wheel co-axial with the first sun wheel and corresponding to the other set of sub-compartments. The pump means may then be provided in one of the sub-suction compartments, and the torque-generating elements associated with the planet wheel may be provided in one of the sub-delivery compartments. Each of the remaining sub-suction compartments of the set may then be provided with its own pump means and having a planet wheel and drive means with its associated torque-generating elements disposed in an associated sub-delivery compartment, the several drive means drivingly connecting their associated planet wheels with the first mentioned sun wheel. In each sub-suction compartment there may be provided further torque-generating elements with an associated further planet wheel and drive means, the several drive means drivingly connecting their associated planet wheels with the second sun wheel. The torque-generating elements and associated parts corresponding to the sets of sub-compartments are mounted in dynamic balance about the carrier axis.

The drum may have an additional compartment adapted to contain hydraulic fluid and the several planet wheels having their torque-generating elements disposed in the sub-suction compartments, may also have pump means, the said pump means being disposed in the additional compartment and being adapted to displace liquid from the adidtional compartment into the sub-suction compartments. Additional return means may be provided between the additional compartment and the sub-suction compartments. The additional compartment may be constituted by a plurality of sub-additional compartments also circumferentially spaced about the drum axis and in communication with each other. There may be provided a third sun wheel co-axial with the drum. In each sub-additional compartment there may be provided torque-generating elements together with a planet wheel mounted on the carrier to rotate about its own axis, and several drive means drivingly connecting the several planet wheels to the third sun wheel. The suction compartment with torque-generating elements and connected parts then constitute an intermediate stage. When several sun wheels are provided, they may be connected to a common output shaft, one of the sun wheels being connected directly to the output shaft, and the others being each connected to it via a gear train and a free-wheel device.

The pump means may include circumferentially spaced scoops extending outwardly from the planet wheel axis and drivingly connected to the planet wheel, the scoops having inlets at their outer ends and having outlets at their inner ends, the outlets being axially spaced from the inlets for delivery into the delivery compartment. An alternative form of pump means includes a vane wheel coaxial with the planet wheel and fast with it and having vanes between a pair of axially spaced side plates and extending outwardly from a shaft, outlet openings being provided radially inwardly from the ends of the vanes and leading into axially directed ducts provided from the outlet openings of the vanes, the ducts having outlet openings in the delivery compartment.

The torque-generating elements may include liquid-entrapping means defining a plurality of recesses spaced circumferentially away from and around the planet wheel axis, the liquid-entrapping means being adapted when the carrier rotates and when the planet wheel rotates about its axis relatively to the carrier, to receive liquid from a layer against the inner periphery of a compartment, and under the action of centrifugal force to retain liquid and to displace the liquid inwardly towards the carrier axis and then to reject the retained liquid.

The liquid-entrapping means may comprise a plurality of buckets of C-section, extending axially and having openings defined between inner and outer lips relative to the axis of the planet wheel, the openings being directed in one direction about the planet wheel axis, and the inner lips being spaced away from the planet wheel axis, and a clearance space being provided between the inner lips and a shaft provided for supporting the planet wheel and buckets.

The drive means for drivingly connecting a planet wheel with a sun wheel, may be adapted to transmit torque applied about the planet wheel axis in the same direction about the sun wheel axis. The planet wheel and the sun wheel may be toothed gear wheels, the drive means including a toothed idler meshing with them both. Alternatively the planet wheel and sun wheel may be toothed sprockets, the drive means including a chain meshing with them both. If desired, the pitch diameter of a planet wheel may be substantially the same as that of the sun wheel with which it is drivingly connected.

The sun wheel may be an internally toothed gear wheel and the planet wheel may then be a toothed gear wheel meshing with it.

The invention will now be described by way of example, with reference to the accompanying diagrammatic drawings.

Figure 1:
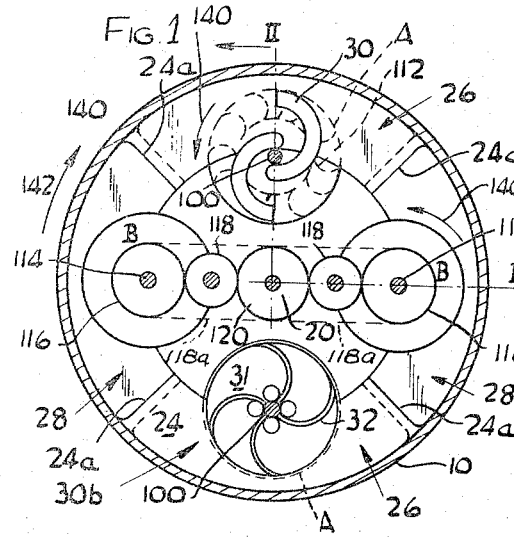
FIGURE 1 shows a cross-section of a torque transmitter at I—I in FIGURE 2.
Figure 3:
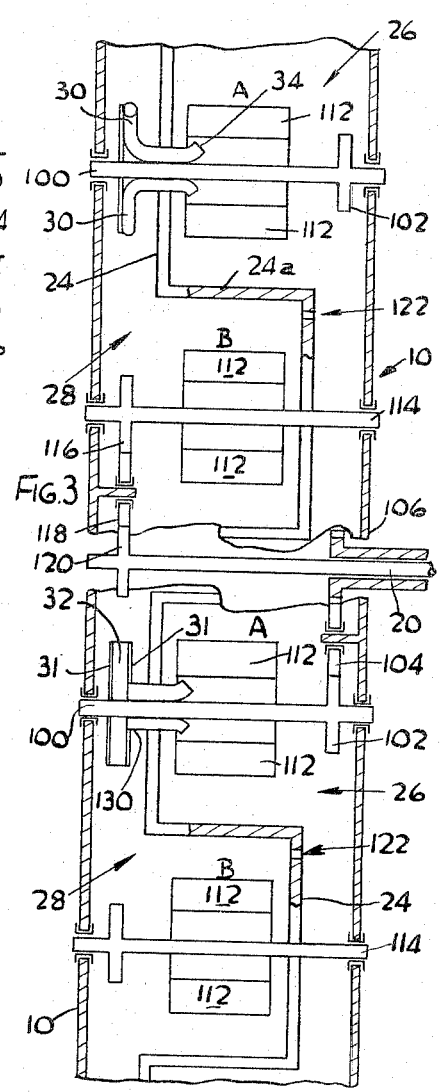
FIGURE 3 shows a fragmentary developed axial section of the invention.
Figure 2:
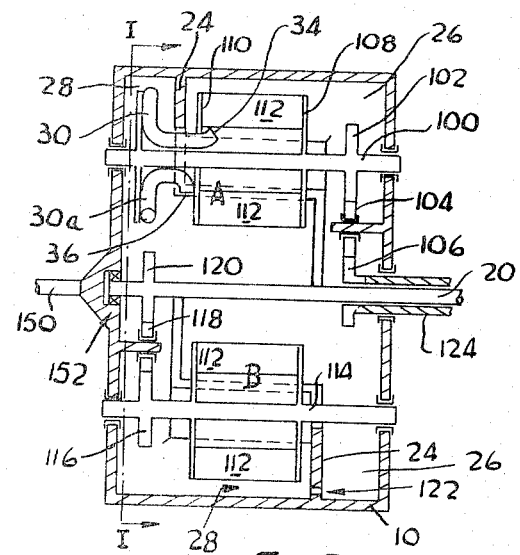
FIGURE 2 shows an axial section at II—II in FIGURE 1.

Referring to FIGURES 1, 2, and 3 of the drawings, reference numeral 10 refers to a carrier in the form of a drum having a delivery compartment constituted by two opposed sub-delivery compartments 26, and a suction compartment constituted by two opposed sub-suction compartments 28. The two pairs of sub-compartments are spaced circumferentially and are separated by a circumferential wall 24, extending inwardly from the inner periphery of the drum. Furthermore, the sub-compartments are separated by axially extending walls 24a, projecting inwardly from the inner periphery of the drum.

In the sub-delivery compartments 26, are shown bucket wheels A which are identical, but which are shown for the sake of convenience and for saving space, as having different pump means. In practice, the pump means will conveniently be the same for the two bucket wheels A. The pump means will be described hereafter.

The bucket wheels A are mounted on shafts 100 on which are also mounted toothed planet wheels 102, meshing with toothed idler wheels 104, which in turn mesh with toothed sun wheel 106. The bucket wheel A comprises a pair of axially spaced side plates 108 and 110 (see FIGURE 2) between which are mounted a plurality of circumferentially spaced buckets 112 of substantially C-section, the inner lips of the buckets being spaced away from the shaft 100. The inner and outer lips of the C-section buckets define openings which are directed in one direction about the axis of the shaft 100.

In the sub-suction compartments 28, are mounted further bucket wheels B, mounted on shafts 114 having further toothed planet wheels 116 (see FIGURE 3). A toothed idler 118 is provided, mounted to rotate about an axis parallel to the carrier axis, and meshing with the further planet wheels 116, and with the further toothed sun wheel 120 connected to the output shaft 20.

Instead of idlers 104 and 118, chains such as 118a may be provided and then the associated planet and sun wheels will be toothed sprockets.

Bleed holes 122 are provided in the wall 24, separating the sub-suction compartments 28 from the sub-delivery compartments 26.

Figure 4:
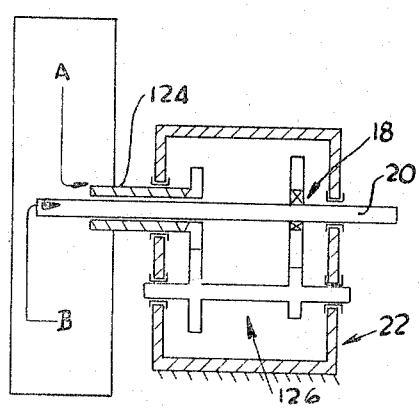
FIGURE 4 shows diagrammatically an axial section of a torque transmitter according to the invention in combination with a gear box.

Referring now to FIGURES 2 and 4 of the drawings, the hollow shaft 124 to which is connected sun wheel 106, is connected via a gear train 126 and via a free-wheel device 18 to the output shaft 20. The gear train is mounted in a casing 22, which is anchored. It will be noted from FIGURE 4 that the bucket wheels A transmit torque to the output shaft 20, via the hollow shaft 124 and via the gear train 126 and via the free-wheel device 18. On the other hand, the bucket wheels B are arranged to drive directly onto the output shaft 20.

Referring again to FIGURES 1, 2, and 3 of the drawings, the pump means may comprise scoop means 30, as can be seen in the upper half of FIGURE 1. The scoop means may have an axially directed part having an outlet opening 34 disposed within the space between the inner lips of the buckets 112, and thhe shaft 100. Alternatively, the scoop means 30a may be provided. These scoop means 30a have outlet openings 36, arranged to deliver merely to the sub-delivery compartments 26 without delivering into the bucket wheels A.

Referring now to the pump means shown in the lower half of FIGURE 1, it will be noted that the pump means comprises a vane wheel 30b, having vanes 32 extending outwardly from the shaft 100, and between a pair of axially spaced side plates 31 (see also FIGURE 3) openings being provided in one side plate, inwardly from the outer ends of the vanes 32, and being connected to tubes 130 (see FIGURE 3) having outlet openings in the sub-delivery compartments 26. The upper and lower halves of FIGURES 1 and 3 must not be regarded as showing a single torque transmitter; they show in fact alternative pump constructions.

In operation, during starting, i.e. as long as the output speed of the shaft 124 is not equal to the input speed to the carrier 10, the bucket wheels A rotate about their axes relative to the carrier 10. In doing so, the pump means 30 or 30a or the vane pump having vanes 32, pump liquid from the sub-suction compartments 28 into the sub-delivery compartments 26. The bleed holes 122 permit the bleeding back of fluid from the sub-delivery compartments 26 to the sub-suction compartments 28.

As long as the pump means pump out more liquid than the amount bled back via the bleed holes 122, the bucket wheels B will be without fluid, and will thus not be able to generate torque or to absorb torque from the input shaft. As the output shaft speeds up, however, so the rate of rotation of the bucket wheels A relative to the carrier, slows down and hence the rate of pumping from the sub-suction compartments into the sub-delivery compartments, also slows down, and more liquid bleeds into the sub-suction compartments than is pumped out of them. This results in a layer of liquid being formed in the sub-suction compartments 28 against the inner periphery of the drum, thus permitting the buckets 112 of the bucket wheels B to entrap liquid and to generate torque about their axes, which torque is transmitted via the drive means onto the output shaft 20. The torque generated by the bucket wheels A is transmitted to the output shaft 20 via the hollow shaft 124, via the gear train 126, and via the free-wheel device 18.

The buckets of the bucket wheels A (or B) when the bucket wheels rotate about their axes relative to the carrier, pass through the layer of liquid in the drum and entrap liquid from this layer and carry it around towards the central region of the drum in the direction of arrow 140 (see FIGURE 1), when the drum rotates in the direction of arrow 142. The liquid is retained on one side of the bucket wheel relative to the direction of rotation of the carrier about its axis. Fluid is rejected in the central region of the drum, thereby providing an unbalanced mass of liquid on the one side of the bucket wheel. Centrifugal force acting on the unbalanced mass as a result of rotation of the carrier about its axis, generates a moment about the planet wheel axis, which moment is transmitted via the drive means onto the associated sun wheel and thence onto the output shaft 20.

Figure 5:
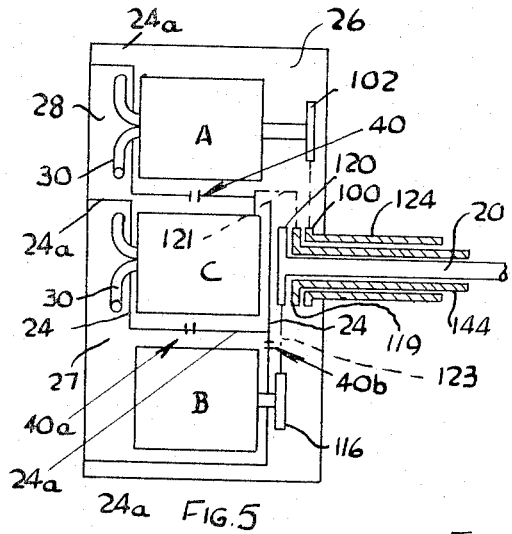
FIGURE 5 shows diagrammatically an axial section of an embodiment in which an intermediate stage is used.

FIGURE 5 shows an embodiment incorporating an intermediate stage. It will be noted that three sets of bucket wheels A, B, and C, are provided. The bucket wheel set C, is an intermediate set, and is also provided with pump means 30 (or 30a) or pump means 30b having vanes. The pump means of a bucket wheel C is arranged to pump from the compartment 27 within which the bucket wheels B are arranged to operate, and may be arranged to deliver into the sub-compartments 28 or 26.

Additional return means in the form of bleed holes 40a are provided between the sub-compartments 28 and the compartment 27, so that fluid can bleed from sub-compartment 28 into compartment 27, thereby rendering operative the wheels B when fluid remains in the compartment 27. Instead of bleed holes 40a, the additional return means may be in the form of bleed holes 40b between sub-compartments 26 and compartment 27. The bucket wheels A are arranged to drive onto hollow output shaft 124, the bucket wheels C being arranged to drive via further drive means 121 and further sun wheel 119 onto hollow output shaft 144, and finally, bucket wheels B are arranged to drive via additional drive means 123 onto the output shaft 20. It is therefore possible for torque to be transmitted in three stages onto the output shaft 20 via different gear trains and free-wheel devices associated with the hollow output shafts 124 and 144, in a manner similar to that shown in FIGURE 4, and as described above.

It is possible with the construction described above, for torque to be generated in stages by the various bucket wheels, the change-over from the one set of bucket wheels to the next, taking place automatically as the output shaft speeds up when power is applied to the carrier. As the output shaft speeds up, so pumping by the pump means of the various stages will stop, thereby rendering operative the next succeeding stage of bucket wheels.

The stage coming into operation first will drive the output shaft 20 through a gear train providing a high torque on the output shaft at starting. The next stage will take over at a predetermined speed to transmit torque to the output shaft through the gear train for that stage. And so on until the final stage which drives directly onto the output shaft.

If desired, an overrunning free-wheel device may be provided between the output shaft 20, and between the input shaft 150, for example at 152 (as shown in FIGURE 2) so as to permit the running of the apparatus against compression, for example when applied for use in a motor vehicle.

Figure 6:
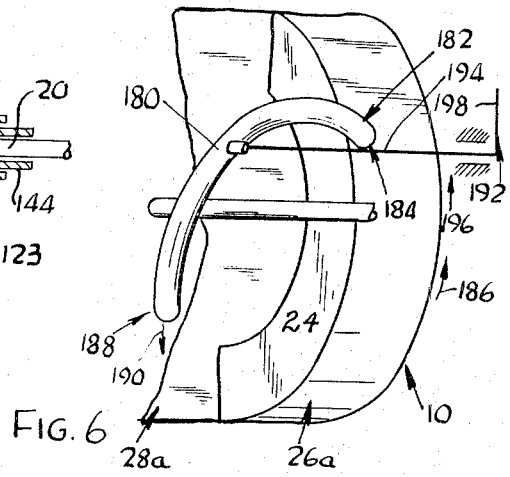
FIGURE 6 shows diagrammatically a three-dimensional view of scoop means.

Referring now to FIGURE 6 of the drawings, reference numeral 10 shows a fragmentary view of the drum in three dimensions. Reference numeral 24 indicates the circumferential wall extending radially inwardly from the inner periphery of the drum, and separating an additional compartment 26a in communication with a delivery compartment 26, from a further additional compartment 28a in communication with a suction compartment 28. Scoop means 180 is provided, having an inlet opening at 182, to receive liquid entering in the direction of arrow 184, when the drum rotates in the direction of arrow 186. The scoop 180 passes from the one compartment 26a over to the other 28a by extending obliquely over the wall 24. The scoop has an outlet opening 188 adapted to discharge liquid into the compartment 28a, in the direction of arrow 190. Scoop control means are provided for controlling the immersion of the inlet 182 in a layer of fluid in compartment 26a. The scoop control means is indicated generally by reference numeral 192 and comprises a shaft 194 connected to the scoop 180. The shaft is pivotally displaceable about its axis in a bearing 196 by means of a handle 198.

Figure 7:
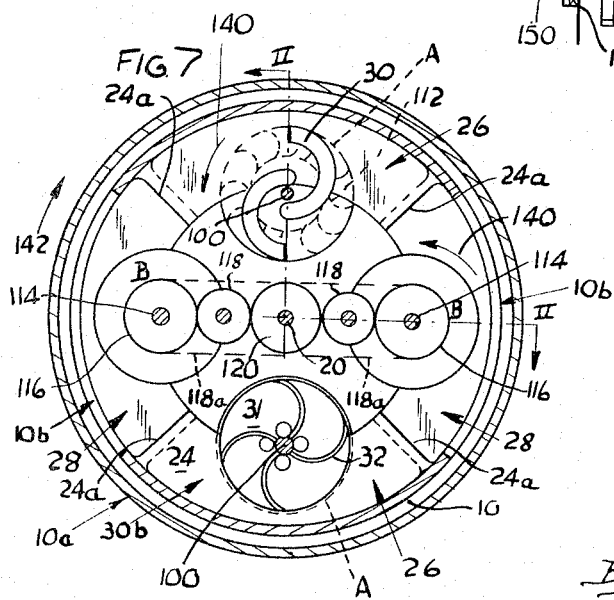
FIGURE 7 shows a cross-section of a torque transmitter in which the drum is loose around the carrier.

By way of modification, the delivery compartment may be provided in a loose drum co-axial with the carrier and mounted to be freely rotatable relative to the carrier about the carrier axis. The carrier will then only have the sub-compartments 26, and the fluid return means will be arranged to return fluid from the carrier subcompartments 26 to the loose drum. Such a construction is shown in FIGURE 7 of the drawings, similar to the construction of FIGURE 1. The loose drum is indicated by reference numeral 10a. The carrier has openings 10b to connect the sub-compartments 28 with the interior of the drum 10a. The other reference numerals in FIGURE 7 indicate like numbered parts in FIGURE 1.

Figure 8:
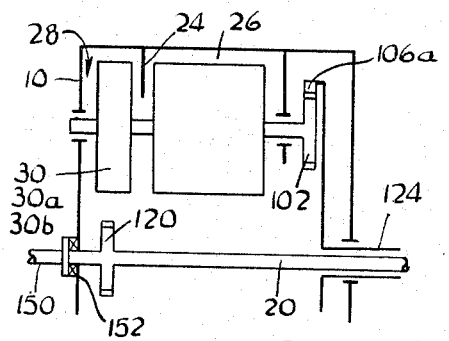
FIGURE 8 shows an axial section of a modified construction similar to FIGURE 2.

Referring to FIGURE 8, a construction is shown corresponding to FIGURE 2, and having an internally toothed sun wheel 106a instead of an externally toothed sun wheel 106. The construction is similar to that shown in FIGURE 2, and like reference numerals refer to like parts. The drive means is constituted by the direct meshing between the sun wheel 106a and planet wheels 102.

The intercommunication between a plurality of circumferentially spaced sub-suction compartments may be provided by having a compartment in the carrier, axially spaced from the sub-suction compartments, and without inwardly directed axially extending walls. It is thus possible for a torus or annular layer of liquid to form within the said compartment when the carrier rotates.

The sub-suction compartments may then be placed in communication with each other by providing an axially directed passage at the carrier periphery leading from each sub-suction compartment into the said compartment in the carrier.

The sub-delivery compartments may be interconnected in similar fashion by providing another similar compartment in the carrier and similar axially directed passages at the carrier periphery and communicating with the said compartment and the sub-delivery compartments.

The two said compartments adapted to contain an annular ring or torus of liquid may then have return means provided between them, for example as shown in FIGURE 6 between compartments 26a and 28a. Alternatively, return means in the form of bleed holes may be provided between individual sub-suction and sub-delivery compartments. In this fashion sets of planet wheels may be arranged in dynamic balance about the axis of the carrier, each set of planet wheels being drivingly connected to its own sun wheel.

I claim:

1. A torque transmitter which comprises a carrier having means for mounting it rotatably about its axis and having means for connecting it to a source of rotary power; a drum around the carrier and co-axial with it, there being provided at least two compartments within the drum adapted to contain hydraulic fluid; at least one planet wheel mounted on the carrier to rotate about its own axis spaced away from the carrier axis; torque-generating elements in at least one of the compartments and connected to the planet wheel; a sun wheel co-axial with the carrier axis and having means for connecting it to a load to absorb rotary power; drive means drivingly connecting the planet wheel with the sun wheel and adapted to transmit torque applied about the axis of the planet wheel to the sun wheel; and pump means drivingly connected to the planet wheel and adapted when the planet wheel rotates relatively to the carrier to displace liquid out of one compartment, referred to as the suction compartment, into another compartment, referred to as the delivery compartment.

2. A torque transmitter according to claim 1, in which return means are provided for returning liquid from the delivery compartment to the suction compartment.

3. A torque transmitter according to claim 2, in which there is provided a wall separating the two compartments, and in which the return means include at least one bleed hole provided in the said wall.

4. A torque transmitter according to claim 2, in which the carrier and drum are integral and in which the drum has at least two axially spaced compartments, one in communication with the suction compartment, and the other in communication with the delivery compartment, the two axially spaced compartments being separated by a circumferential wall extending inwardly from the drum inner periphery and defining a central opening; and in which the return means includes a scoop extending across the said wall through the central opening and mounted in the drum and having an inlet adapted to receive liquid from the inner periphery of the one axially spaced compartment, and having an outlet over the other axially spaced compartment, and means for displacing the inlet of the scoop into and out of a layer of liquid along the inner periphery of the said axially spaced compartment; whereby liquid may be transferred from the one axially spaced compartment to the other when the carrier rotates.

5. A torque transmitter according to claim 1, in which the torque-generating elements are disposed in the delivery compartment.

6. A torque transmitter according to claim 2, in which the carrier and drum are integral.

7. A torque transmitter according to claim 6, in which the drum has a plurality of sub-suction compartments circumferentially spaced about the drum axis, and being interconnected to constitute the suction compartment, the pump means being arranged to serve one of the sub-suction compartments; and in which for each remaining sub-suction compartment there are provided pump means together with an associated planet wheel, torque-generating elements, and drive means for drivingly connecting the said planet wheel to the sun wheel; the several pump means and their associated planet wheels with their drive means and torque-generating elements being mounted in dynamic balance about the drum axis, the drive means of the several planet wheels engaging with the sun wheel.

8. A torque transmitter according to claim 6, and in which the drum has an additional compartment adapted to contain hydraulic fluid, and in which there is provided a further planet wheel mounted on the carrier to rotate about its own axis spaced away from the carrier axis; further torque-generating elements connected to the further planet wheel; a further sun wheel co-axial with the carrier axis, and having means for connecting it to a load to absorb rotary power; further drive means drivingly connecting the further planet wheel with the further sun wheel and adapted to transmit torque applied about the axis of the planet wheel to the sun wheel; further pump means connected to the planet wheel and adapted when the planet wheel rotates relative to the carrier to displace liquid out of the additional compartment into the suction compartment, and return means for returning liquid from the suction compartment into the additional compartment.

9. A torque transmitter according to claim 8, in which there is provided at least one additional planet wheel mounted on the carrier to rotate about its own axis spaced away from the carrier axis; additional torque-generating elements in the additional compartment and connected to the additional planet wheel; an additional sun wheel co-axial with the carrier axis and having means for connecting it to a load to absorb rotary power; additional drive means drivingly connecting the additional planet wheel with the additional sun wheel and adapted to transmit torque applied about the axis of the planet wheel to the sun wheel.

10. A torque transmitter according to claim 6, and in which the drum has a plurality of sub-suction compartments comprising a set, and a plurality of sub-delivery compartments comprising a second set, the sets of sub-compartments being circumferentially spaced about the drum axis, the sub-suction compartments being interconnected to constitute the suction compartment, and the sub-delivery compartments being interconnected to constitute the delivery compartments; the said sun wheel corresponding to one set of sub-compartments and there being provided a second sun wheel co-axial with the first sun wheel and corresponding to the other set of sub-compartments; and in which the said pump means are provided in one of the sub-suction compartments and the said torque-generating elements associated with the said planet wheel in one of the sub-delivery compartments; and in which in each of the remaining sub-suction compartments of the set there are provided pump means having a planet wheel and drive means with its associated torque-generating elements disposed in an associated sub-delivery compartment, the several drive means drivingly connecting the associated planet wheels with the said sun wheel; and in which in each sub-suction compartment there are provided further torque-generating elements with an associated further planet wheel and drive means, the several drive means drivingly connecting their associated further planet wheels with the second sun wheel, the several sets of torque-generating elements and associated parts being mounted in dynamic balance about the carrier axis.

11. A torque transmitter according to claim 10, in which the drum has an additional compartment adapted to contain hydraulic fluid, and in which the several planet wheels having their torque-generating elements disposed in the sub-suction compartments also have pump means, the said pump means being disposed in the additional compartment and being adapted to displace liquid from the additional compartment into the sub-suction compartments, and in which additional return means are provided between the additional compartment and the sub-suction compartments.

12. A torque transmitter according to claim 11, in which the additional compartment is constituted by a plurality of sub-additional compartments circumferentially spaced about the drum axis and in communication with each other, and in which a third sun wheel is provided co-axial with the drum, and in which in each sub-additional compartment there are provided torque-generating elements together with a planet wheel mounted on the carrier to rotate about its own axis, and several drive means drivingly connecting the several planet wheels to the third sun wheel.

13. A torque transmitter according to claim 10, in which the several sun wheels are connected to a common output shaft, one of the sun wheels being connected directly to the output shaft, and the others being each connected to it via a gear train and a free-wheel device.

14. A torque transmitter according to claim 1, in which the pump means includes circumferentially spaced scoops extending outwardly from the planet wheel axis and drivingly connected to the planet wheel, the scoops having inlets at their outer ends and having outlets at their inner ends, the outlets being axially spaced from the inlets for delivery into the delivery compartment.

15. A torque transmitter according to claim 1, in which the torque-generating elements include liquid-entrapping means defining a plurality of recesses spaced circumferentially away from and around the planet wheel axis, the liquid-entrapping means being adapted when the carrier rotates and when the planet wheel rotates about its axis relatively to the carrier, to receive liquid from a layer against the inner periphery of the drum, and under the action of centrifugal force to retain liquid and to displace the liquid inwardly towards the carrier axis and then to reject retained liquid.

16. A torque transmitter according to claim 15, in which the liquid-entrapping means comprise a plurality of buckets of C-section extending axially and having openings defined between inner and outer lips relative to the axis of the planet wheel, the openings being directed in one direction about the planet wheel axis, and a clearance space being provided between the inner lips and a shaft provided for supporting the planet wheel and buckets.

17. A torque transmitter according to claim 1, in which the drive means for drivingly connecting a planet wheel with a sun wheel, is adapted to transmit torque applied about the planet wheel axis in the same direction about the sun wheel axis.

18. A torque transmitter according to claim 17, in which the planet wheel and sun wheel are toothed gear wheels, and in which the drive means includes a toothed idler meshing with them both.

19. A torque transmitter according to claim 17, in which the planet wheel and sun wheel are toothed sprockets, and in which the drive means includes a chain meshing with them both.

20. A torque transmitter according to claim 10, in which one of the sun wheels is connected directly to an output shaft, and in which the planet wheels and the said sun wheels are toothed gear wheels of about the same pitch circle diameter, and in which the drive means includes idler wheels meshing with the planet wheels and with the said sun wheel.

21. A torque transmitter according to claim 1, in which the sun wheel is an internally toothed gear wheel, and the planet wheel is a toothed gear wheel meshing with it.

22. A torque transmitter according to claim 8, in which at least one of the sun wheels is an internally toothed gear wheel, and the planet wheels meshing with it are toothed gear wheels.

23. A torque transmitter according to claim 15, in which the pump means is arranged to deliver fluid into the liquid-entrapping means of the torque-generating elements which are connected to the said pump means.

References Cited

UNITED STATES PATENTS

| | | | |
|---|---|---|---|
| 2,565,551 | 8/1951 | Dougherty | 74—687 |
| 3,261,233 | 7/1966 | Cancrinus | 74—752 X |
| 3,276,291 | 10/1966 | Cancrinus et al. | 74—752 |

DONLEY J. STOCKING, *Primary Examiner.*

DAVID J. WILLIAMOWSKY, *Examiner.*

J. R. BENEFIEL, *Assistant Examiner.*